(12) United States Patent
Meerbeek et al.

(10) Patent No.: US 11,224,111 B2
(45) Date of Patent: Jan. 11, 2022

(54) METHOD AND SYSTEM FOR CONTROLLING A LIGHTING DEVICE BASED ON A LOCATION AND AN ORIENTATION OF A USER INPUT DEVICE RELATIVE TO THE LIGHTING DEVICE

(71) Applicant: SIGNIFY HOLDING B.V., Eindhoven (NL)

(72) Inventors: Berent Willem Meerbeek, Eindhoven (NL); Dzmitry Viktorovich Aliakseyeu, Eindhoven (NL); Sanae Chraibi, Eindhoven (NL); Jonathan David Mason, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 54 days.

(21) Appl. No.: 16/061,083

(22) PCT Filed: Dec. 1, 2016

(86) PCT No.: PCT/EP2016/079508
§ 371 (c)(1),
(2) Date: Jun. 11, 2018

(87) PCT Pub. No.: WO2017/102367
PCT Pub. Date: Jun. 22, 2017

(65) Prior Publication Data
US 2018/0368239 A1    Dec. 20, 2018

(30) Foreign Application Priority Data
Dec. 14, 2015   (EP) ...................................... 15199726

(51) Int. Cl.
*H05B 47/19*      (2020.01)
*H05B 47/10*      (2020.01)
(Continued)

(52) U.S. Cl.
CPC ......... *H05B 47/19* (2020.01); *G06F 3/04883* (2013.01); *H04L 67/125* (2013.01); *H05B 47/10* (2020.01)

(58) Field of Classification Search
CPC ...... G06F 3/005; G06F 3/0346; G06F 3/0227; G06F 3/0325; G06F 3/048;
(Continued)

(56) References Cited

U.S. PATENT DOCUMENTS 8,150,384 B2   4/2012   Abifaker et al.
8,872,442 B2   10/2014  Fushimi
(Continued)

FOREIGN PATENT DOCUMENTS

| CN | 102293059 A | 12/2011 |
|----|-------------|---------|
| CN | 103116469 A | 5/2013  |

(Continued)

*Primary Examiner* — Borna Alaeddini
(74) *Attorney, Agent, or Firm* — Daniel J. Piotrowski (57) ABSTRACT

A method 800 of controlling at least one lighting device 110 in a space is disclosed. The method 800 comprises the steps of receiving 802 a first user input related to a light setting, sensing 804 a second user input indicative of a direction relative to a user input device 104, obtaining 806 information indicative of an orientation of the user input device 104, obtaining 808 information indicative of a location of the user input device 104, obtaining 810 information indicative of locations of one or more lighting devices 110, determining 811, based on the locations of the one or more lighting devices 110 and the location and the orientation of user input device 104, the location and the orientation of the user input device 104 relative to the one or more lighting devices 110, determining 812, based on the location and the orientation of the user input device 104 relative to the one or more lighting devices 110, if a lighting device 110 is located in the direction, generating 814 a control command for the lighting device 110 based on the light setting, and transmitting 816
(Continued)

the control command to the lighting device 110 so as to control the lighting device 110 according to the light setting.

18 Claims, 8 Drawing Sheets

(51) Int. Cl.
  *G06F 3/0488* (2013.01)
  *H04L 29/08* (2006.01)
(58) Field of Classification Search
  CPC ........... G06F 3/04815; G06F 3/0484; G06F 3/04842; G06F 3/04883; G06T 17/00; G06T 2219/024; G06T 7/32; G06T 7/74; G06T 7/80; H05B 47/10; H05B 47/19; H04L 67/125
  See application file for complete search history.

(56) References Cited

U.S. PATENT DOCUMENTS

| | | |
|---|---|---|
| 2005/0243549 A1 | 11/2005 | Ruston |
| 2009/0002981 A1 | 1/2009 | Knibbe |
| 2009/0241052 A1 | 9/2009 | Ha et al. |
| 2010/0207879 A1 | 8/2010 | Fadell et al. |
| 2011/0276152 A1 | 11/2011 | Cuppen et al. |
| 2013/0141009 A1 | 6/2013 | Jin et al. |
| 2013/0141011 A1 | 6/2013 | Fushimi |
| 2014/0247280 A1* | 9/2014 | Nicholas ............... G06T 19/006 345/633 |
| 2015/0139483 A1 | 5/2015 | Shen |
| 2015/0185825 A1* | 7/2015 | Mullins ................. G06T 19/006 345/633 |
| 2015/0351204 A1 | 12/2015 | Hershberg et al. |
| 2017/0139582 A1* | 5/2017 | Maricic ................ H05B 47/125 |

FOREIGN PATENT DOCUMENTS

| | | |
|---|---|---|
| CN | 104102335 A | 10/2014 |
| CN | 104144538 A | 11/2014 |
| CN | 104519613 A | 4/2015 |
| RU | 2469409 C2 | 12/2012 |
| WO | WO2010084462 A1 | 7/2010 |
| WO | 2011142516 A1 | 11/2011 |
| WO | WO2013085600 A2 | 6/2013 |
| WO | WO2014178713 A1 | 11/2014 |
| WO | WO2014181205 A2 | 11/2014 |
| WO | 2015185402 A1 | 12/2015 |

* cited by examiner

METHOD AND SYSTEM FOR CONTROLLING A LIGHTING DEVICE BASED ON A LOCATION AND AN ORIENTATION OF A USER INPUT DEVICE RELATIVE TO THE LIGHTING DEVICE

CROSS-REFERENCE TO PRIOR APPLICATIONS

This application is the U.S. National Phase application under 35 U.S.C. § 371 of International Application No. PCT/EP2016/079508, filed on Dec. 1, 2016, which claims the benefit of European Patent Application No. 15199726.9, filed on Dec. 14, 2015. These applications are hereby incorporated by reference herein.

FIELD OF THE INVENTION

The invention relates to a method of controlling at least one lighting device in a space. The invention further relates to a computer program product for performing the method. The invention further relates to a lighting system for controlling at least one lighting device in a space. The invention further relates to a user input for use in the lighting system.

BACKGROUND

Current and future home and office environments will contain a large number of controllable lighting devices. Typically, such lighting devices are controlled via a light switch or a smart device, such as a smartphone. A user interface of the smartphone allows a user to select a light setting, which light setting is then communicated (wirelessly) to one or more lighting devices. Controlling lighting devices via such a smart device may be cumbersome, especially when a user wants to control multiple lighting devices individually.

Patent application US 20110276152 A1 discloses an apparatus for providing (light) settings of a control system for implementing a spatial distribution of perceptible output in a physical space, which control system is configured to control at least one output device (e.g. a lighting device) positioned in that physical space. The control system is further configured to maintain in memory data representative of locations associated with the respective output devices in the physical space relative to a reference point. The control system further includes an input device for obtaining user input pertaining to at least one location associated with one of the output devices. The (light) settings are based on data representative of the user input. The input device includes at least one component for manipulation by a user to position at least a first point on the component and a sensor arrangement arranged to provide output for detecting an angular coordinate of the first point about at least one axis through a second point of the input device. The angular coordinates may be shown as compass points, which correspond to sectors in the physical space. This allows a user to select one or more (lighting) devices by selecting an angular coordinate, whereupon the user may select a (light) setting for the selected (lighting) device. It is required that a user configures the control system before the user can select the lighting devices.

SUMMARY OF THE INVENTION

It is an object of the present invention to provide a method and a lighting system for controlling lighting devices in a space via directional user input. It is a further object of the present invention to provide a method and a lighting system for controlling lighting devices in a space via directional user input, wherein no commissioning by the user is required. It is a further object of the present invention to provide a method and a lighting system or controlling lighting devices in a space, which control takes less cognitive effort for a user.

According to a first aspect of the present invention, the object is achieved by a method of controlling at least one lighting device in a space, the method comprising the steps:

receiving a first user input related to a light setting, sensing a second user input indicative of a direction relative to a user input device, obtaining information indicative of an orientation of the user input device, obtaining information indicative of a location of the user input device, obtaining information indicative of locations of one or more lighting devices, determining, based on the locations of the one or more lighting devices and the location and the orientation of the user input device, the location and the orientation of the user input device relative to the one or more lighting devices, determining, based on the location and the orientation of the user input device relative to the one or more lighting devices, if a lighting device is located in the direction, generating a control command for the lighting device based on the light setting, and transmitting the control command to the lighting device so as to control the lighting device according to the light setting.

By obtaining information about the locations of the one or more lighting devices, the location of the user input device and the orientation of the user input device, the location and the orientation of the user input device can be determined relative to the one or more lighting devices. Thereby, the relative direction of the second user input can be determined, which enables determining if a lighting device is located in the direction. This enables a user to simply select a light setting and select a direction on the user input device, whereupon a lighting device located in that direction is controlled according to the light setting of the first user input. A user may, for example, select an icon of a light setting (e.g. a light scene) on a touch screen of a smartphone, and drag that icon in the direction of the lighting device, and thereby control the light output of the lighting device according to the selected light setting. The locations of the one or more lighting devices and the location and orientation of the user input devices can be either sensed or communicated to a lighting control system, which provides the advantage that no commissioning steps are required of the user.

In an embodiment of the method, the direction is indicative of an area in the space, and the step of determining if the lighting device is located in the direction comprises determining if the lighting device is located in the area. In this embodiment, the lighting device does not need to be located at a location exactly in the direction as indicated by the second user input. This allows a user to select a lighting device by providing the direction substantially towards the location of the lighting device, without the requirement of exactly providing the direction towards the location of the lighting device.

In a further embodiment, the area comprises at least a first area and a second area, and wherein the step of determining if the lighting device is located in the area further comprises determining if the lighting device is located in the first area or in the second area, and wherein the step of generating a control command for the lighting device based on the light setting comprises:

generating a first control command for the lighting device based on the light setting if the lighting device is located in the first area, and generating a second control command for the lighting device based on a second light setting if the lighting device is located in the second area.

An advantage of this embodiment is that it enables a user to select a plurality of lighting devices by providing a single user input, and to control the lighting devices based on their relative distance to the direction. For example, the first lighting device, located in the first area, maybe controlled according to the first light setting, which is a bright red light setting, while the second lighting device, located in the second area, may be controlled according to the second light setting, which is a less bright light setting. Thus, allowing a user to create a light effect that is created by the light emission of a plurality of lighting devices.

In the previous embodiments of the method, the second user input is a touch input, and the step of sensing the second user input may further comprise sensing an intensity of the second user input, which intensity is based on a speed of a movement of the touch input and/or based on a pressure level of the touch input, and the size of the area may be determined by the intensity of the second user input. This enables a user operating the user input device to determine the size of the area. This may be advantageous if a user desires to select a plurality of lighting devices.

In an embodiment of the method, the second user input is further indicative of a distance, and the step of determining if the lighting device is located in the direction further comprises determining if the lighting device is located within a predetermined proximity of the distance as indicated by the second user input. This enables a user operating the user input device to determine the distance where the lighting device is located at. This may be advantageous if a user wants to control a first lighting device, which is located further away from but in the same direction as a second lighting device, without controlling the second lighting device.

In an embodiment of the method, the second user input is sensed at an input point on the user input device, and the direction is determined by extrapolating a path from a reference point of the user input device through the input point. This allows a user to provide, for example, a user input at the edge of the user input device (the input point), whereupon the direction is determined by extrapolating a path from, for example, the center of the user input device (the reference point) through the input point. Thus, only one user input is required to provide indication of the direction.

Alternatively, the second user input is a gesture, which gesture is indicative of at least two input points, and the direction is determined by extrapolating a path from a first input point of the at least two input points through a second input point of the at least two input points. This allows a user to provide, for example, a swipe gesture, or an arm movement gesture, whereupon the direction is determined by extrapolating a path from a first location of, for example, a finger through a second location of the finger.

Alternatively, the second user input is a sound input, and the direction is determined by the orientation of the user input device. This enables a user to provide the direction by orienting the user input device in the desired direction, and by providing a sound input, for example a voice command, control the light output of one or more lighting devices located in the direction.

According to a second aspect of the present invention, the object is achieved by a computer program product comprising computer program code to perform the method of any one of the above-mentioned methods when the computer program product is run on a processing unit of the computing device.

According to a third aspect of the present invention, the object is achieved by a lighting system for controlling at least one lighting device in a space, the lighting system comprising:

a user input device for receiving a first user input related to a light setting and for sensing a second user input indicative of a direction relative to the user input device, a receiver for receiving information indicative of an orientation of the user input device, and for receiving information indicative of a location of the user input device, a processor for:

a. obtaining information indicative of locations of one or more lighting devices, b. determining, based on the locations of the one or more lighting devices and the location and the orientation of the user input device, the location and the orientation of the user input device relative to the one or more lighting devices, c. determining, based on the location and the orientation of the user input device relative to the one or more lighting devices, if a lighting device is located in the direction, and d. generating a control command for the lighting device based on the light setting, and a transmitter for transmitting the control command to the lighting device so as to control the lighting device according to the light setting.

In an embodiment of the lighting system, the direction is indicative of an area, and the user input device is arranged for detecting an intensity of the first user input, and the size of the area is determined by the intensity of the second user input.

In an embodiment of the lighting system, the user input device comprises a touch sensitive element for detecting a swipe gesture as the second user input, which swipe gesture is indicative of the direction. The swipe gesture may, for example, be a linear swipe from a first point on the touch sensitive element to the second point of the touch sensitive element. The processor may be further arranged for extrapolating a path from the first point through the second point in order to determine the direction. This provides the advantage that it enables a user to control a lighting device by simply swiping in the direction of the lighting device.

In an embodiment of the lighting system, the user input device comprises the receiver, the processor and the transmitter.

In an embodiment, the user input device comprises a location sensor and/or an orientation sensor for detecting the location and/or the orientation, respectively, of the user input device. This enables the user input device to determine its location and/or orientation. The location and/or orientation may be communicated to the processor, which uses this data to determine whether a lighting device is located in the direction as indicated by the second user input.

According to a third aspect of the present invention, the object is achieved by a user input device according to any one of the above-mentioned user input devices for use in any one of the above-mentioned lighting systems.

It should be understood that the claimed lighting system, user input device or computer program product may have similar and/or identical embodiments as the claimed method of controlling at least one lighting device in a space.

BRIEF DESCRIPTION OF THE DRAWINGS

The above, as well as additional objects, features and advantages of the disclosed methods, lighting systems and user input devices, will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
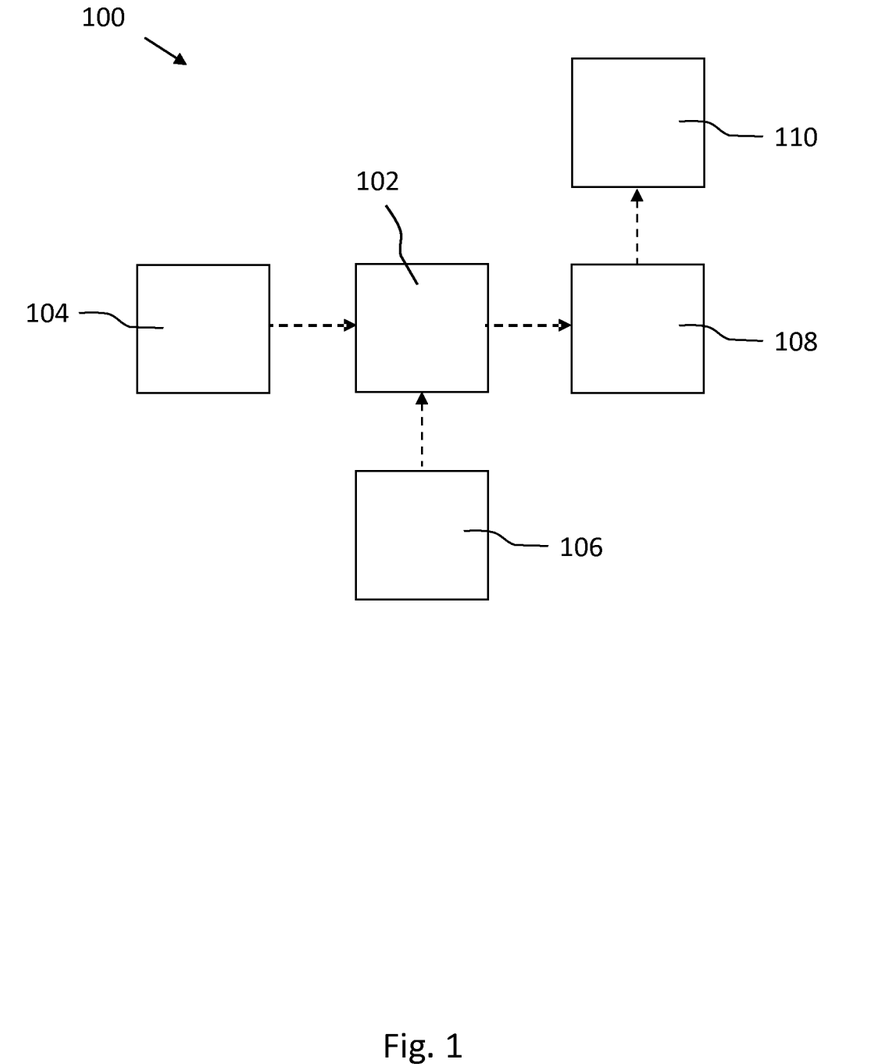
FIG. 1 shows schematically an embodiment of a lighting system according to the invention for controlling at least one lighting device in a space.

FIG. 1 shows schematically an embodiment of a lighting system 100 according to the invention for controlling at least one lighting device 110 in a space (e.g. a home environment, an office space, an outdoor environment, etc.). The lighting system 100 comprises a user input device 104 arranged for receiving a first user input related to a light setting. The user input device 104 is further arranged for sensing a second user input indicative of a direction relative to the user input device 104. The lighting system 100 further comprises a receiver 106 arranged for receiving information indicative of an orientation of the user input device 104 and for receiving information indicative of a location of the user input device 104. The lighting system 100 further comprises a processor 102 (e.g. circuitry, a microcontroller, a microchip, etc.) arranged for obtaining information indicative of locations of one or more lighting devices 110, for determining, based on the locations of the one or more lighting devices 110 and the location and the orientation of the user input device 104, the location and the orientation of the user input device 104 relative to the one or more lighting devices 110, for determining, based on the location and the orientation of the user input device 104 relative to the one or more lighting devices 110, if a lighting device 110 is located in the direction, and for generating a control command for the lighting device 110 based on the light setting. The lighting system 100 further comprises a transmitter 108 for transmitting the control command to the lighting device 110 so as to control the lighting device 110 according to the light setting. This enables a user to, for example, select an icon of a light setting (e.g. a light scene) on a touch screen of a smartphone, and drag that icon in the direction of the lighting device, and thereby control the light output of the lighting device according to the selected light setting.

The receiver 106, the processor 102 and the transmitter 108 of the lighting system 100 may be comprised in the user input device 104. The user input device 104 may for example be a smart device, such as a smartphone or a smart watch, comprising a user interface for receiving the first and second user input. The smart device may further comprise the receiver 106, which may comprise an orientation sensor (such as one or more accelerometers, one or more gyroscopes, one or more magnetometers, one or more tilt sensors, etc.) and a location sensor arranged for receiving location information of the smart device. The smart device may further comprise a processor 102 arranged for determining if a lighting device 110 is located in the direction and for generating the control command for that lighting device 110, and a transmitter 108 for transmitting the control command to the lighting device 110 if the lighting device 110 is located in the direction as indicated by the second user input.

Alternatively, the receiver 106, the processor 102 and the transmitter 108 may be comprised in a standalone device (e.g. a home/office automation system, a central server of a building, a smartphone, etc.) arranged for communicating with the user input device 104. The user input device may for example be a portable luminaire comprising a user interface for receiving the first and the second user input, indicative of a selection of a light setting and a direction relative to the user input device, respectively. Alternatively, the receiver 106, the processor 102 and the transmitter 108 may be distributed over a plurality of devices arranged for communicating with each other.

The user input device 104 may be any type of device arranged for receiving the first user input related to the light setting and the second input indicative of the direction. The user input device 104 may be a smart device (such as a remote control device, a building automation terminal, a smartphone, a smart watch, smart glasses, a tablet pc, etc.), an appliance (such as a luminaire, a television, a game console, etc.) or any other device arranged for receiving the before-mentioned user inputs. The user input device 104 may comprise any type of user interface arranged for receiving the first and the second user input. The user interface may for example comprise a touch-sensitive device such as a touchpad, a touchscreen, one or more buttons and/or one or more sliders for receiving touch input. Examples of user interfaces will be illustrated in examples below.

The first user input is related to a light setting. The user input device 104 may, for example, comprise a touch screen arranged for displaying a color spectrum or a plurality of selectable (icons of) light settings (light scenes). Such light settings may relate to parameters such as the color (hue), brightness (intensity) and/or saturation of the light. Such light settings may further relate to the dynamicity (i.e. the change of one or more parameters over time) of the light.

The second user input may be sensed at an input point on the user input device 104 and the direction may be determined by extrapolating a path from a reference point of the user input device 104 through the input point. This allows a user to provide, for example, a user input at the edge of a touch sensitive surface (the input point), whereupon the direction may be determined by extrapolating a path from, for example, the center of the user input device 104 (the reference point) through the input point. Thus, only one user input would be required to provide indication of the direction.

Alternatively, the second user input is a gesture, which gesture is indicative of at least two input points, and the direction is determined by extrapolating a path from a first input point of the at least two input points through a second input point of the at least two input points. This allows a user to provide, for example, a swipe gesture on a touch sensitive user interface (e.g. a touch screen), whereupon the direction is determined by extrapolating a path from a first location (the first input point) of a user's finger on the touch sensitive user interface through a second location (the second input point) of a user's finger on the touch sensitive user interface. Alternatively, the user input device may comprise a camera for detecting user movements as the second user input. A user may provide, for example, an arm gesture which may be detected by the camera, whereupon the direction is determined by extrapolating a path from a first location (the first input point) of the user's arm through a second location (the second input point) of the user's arm.

Alternatively, the second user input may be a sound input, and the direction may be determined by the orientation of the user input device 104. This enables a user to provide the direction by orienting the user input device 104 in the desired direction, and by providing a sound input, for example a voice command, to control the light output of one or more lighting devices 110 located in the direction. The user input device 104 may comprise a microphone for detecting the sound input, and the processor may be arranged for identifying the voice command.

The lighting system 100 further comprises a receiver 106 arranged for obtaining information indicative of an orientation of the user input device 104 and information indicative of a location of the user input device 104. The user input device may comprise an orientation sensor (such as one or more accelerometers, one or more gyroscopes, one or more magnetometers, one or more tilt sensors, etc.) arranged for detecting the orientation of the user input device 104. The orientation of the user input device 104 may be defined by the roll, pitch and yaw of the user input device 104 around the X, Y and Z axes. Upon detecting its orientation, the user input device 104 may communicate its orientation to the receiver 106. The user input device 104 may further comprise a location sensor for determining the location of the user input device 104. The location of the user input device 104 may be relative to the space wherein the user input device 104 is located, or it may be relative to the location of the one or more lighting devices 110 located in the space. The lighting system 100 may further comprise a positioning system in order to determine the location of the user input device 104 and the one or more lighting devices 110. An example of such a positioning system is an (indoor) positioning system that uses a plurality of radio frequency (RF) beacons distributed throughout the space that may communicate with the location sensor in the user input device 104. The location sensor may for example be an RF transceiver/receiver arranged for transmitting and/or receiving RF signals to/from the beacons. The positioning system may use triangulation or trilateration to calculate the position of the user input device 104 relative to the position of the beacons based on for example the time-of-flight (TOF) of the RF signals received from the beacons, or based on the received signal strength of the RF signals received from the beacons. Additionally or alternatively, the user input device 104 may comprise a light sensor as the location sensor for detecting a coded light signal (a modulated light signal comprising an embedded code) emitted by a light source of a luminaire. This at least one coded light signal may comprise location information of the luminaire, thereby enabling the user input device 104 to determine its location. The location may be determined in further detail based on a characteristic of the received coded light signal (e.g. based on the light intensity of the light, the signal/noise ratio of the signal, the angle of incidence of the light, etc.). Alternative to the positioning system, the user input device may comprise an altitude sensor (e.g. a (milli)barometric pressure sensor) to determine the determine the height (Z-value) of the user input device 104. The location of the user input device may be defined by the X, Y and/or Z coordinates/values in the space. Upon detecting its location, the user input device may communicate its location to the receiver. The location of the one or more lighting devices 110 may be detected in a similar manner, and the detected locations of the one or more lighting devices 110 may be communicated to the processor 102, which uses this information to determine if a lighting device 110 is located in the direction.

The processor 102 of the lighting system 100 is arranged for obtaining information indicative of locations of lighting devices 110. The locations of one or more lighting devices 110 may be stored in a memory that can be accessed by the processor 102. Additionally or alternatively, the processor 102 may be arranged for communicating with an external device, such as a building automation system, that monitors the location of lighting devices 110 (and/or user input devices 104). The building automation system may be arranged for determining the locations of the one or more lighting devices 110 by implementing one or more of the above-mentioned positioning techniques.

Figure 2A:
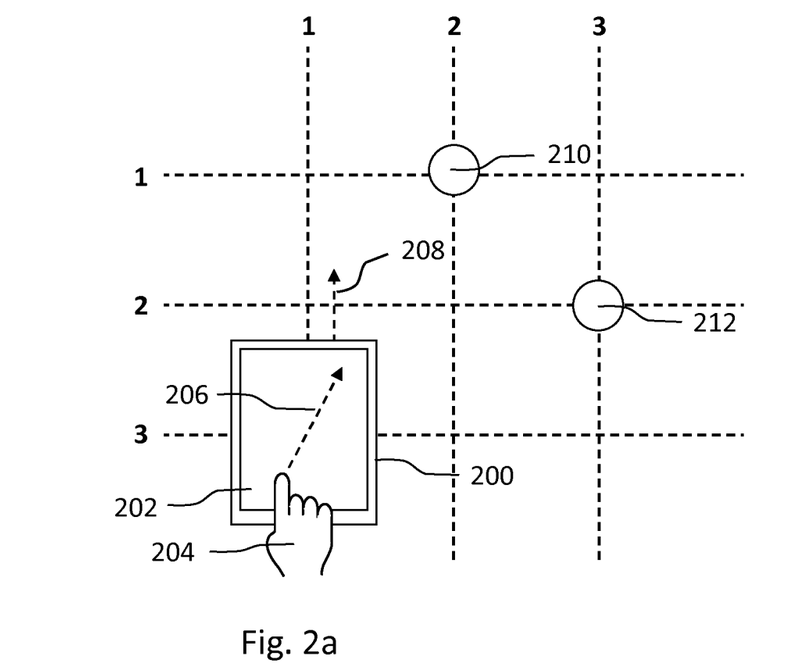
FIGS. 2a and 2b show schematically embodiments of a touch sensitive device according to the invention for controlling at least one lighting device in a space based on the direction as indicated by the user.
Figure 2B:
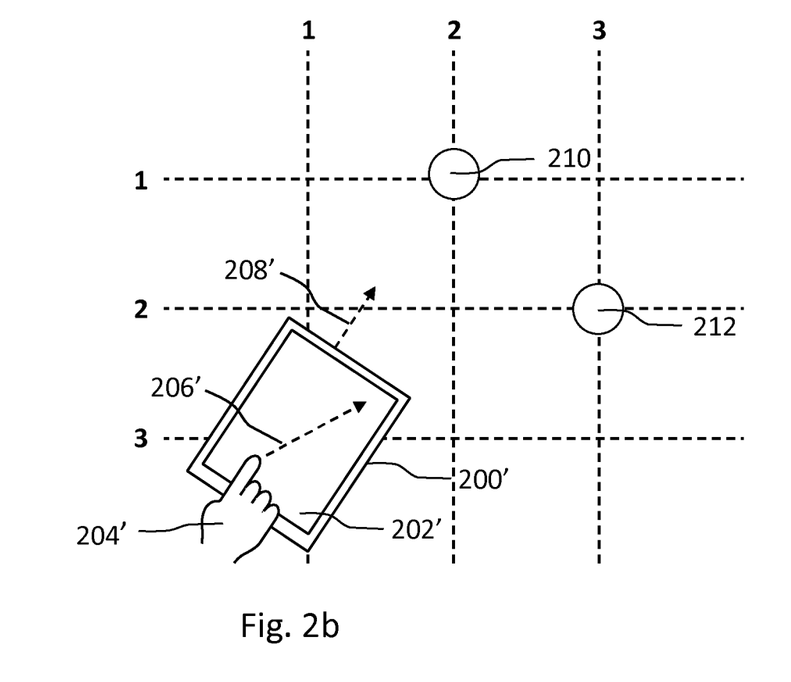

The processor 102 of the lighting system 100 is further arranged for determining if a lighting device 110 is located in the direction as indicated by the second user input. FIGS. 2*a* and 2*b* illustrate a top view of how the processor 102 may determine if a lighting device 104 is located in the direction as indicated by the second user input. FIGS. 2*a* and 2*b* show a grid, which (x, y) coordinates are indicative of the location of a lighting device or the user input device. In the example of FIG. 2*a*, the user input device is a smart device 200 comprising a touch screen 202 arranged for receiving a touch input 204 indicative of the direction 206. The processor (not shown) in FIG. 2*a* obtains the location of lighting device 210, which is located at (1, 2), and the location of lighting device 212, which is located at (2, 3), for example by accessing a memory storing these locations. The receiver (not shown) obtains the location (3, 1) and the orientation 208 of the user input device 200 (for example based on sensor data from sensors in the user input device). The processor may determine, by extrapolating a vector pointing in the direction 206, and based the location of the lighting devices 210, 212 and the location and the orientation 208 of the user input device 200, that lighting device 210 is located in the direction 206 as provided by user input 204.

FIG. 2*b* illustrates that, even when direction 206' relative to the user input device 200' is the same as the direction 206 relative to the user input device 200, lighting device 212 is in the direction 206' because of orientation 208' of user input device 200' (which is different from the orientation 208 of the user input device 200 in FIG. 2*a*). This illustrates that a user can simply select a lighting device by indicating the direction of the to be selected lighting device via the user interface, no matter what the orientation of the user input device is.

The processor 102 is further arranged for generating a control command for the lighting device 110 based on the light setting. The control command comprises instructions for a lighting device 110 that, upon receiving the control command, may execute these instructions so as to control the lighting device's 110 light output. The control command may comprise control instructions for controlling a parameter, such as the color, brightness, saturation, color temperature, etc., of the lighting device 110. The control command may further comprise instructions for the lighting device 110 to emit a dynamic light effect (i.e. a light effect wherein the parameters change over time).

The transmitter 108 of the lighting system 100 is arranged for transmitting the control command to the lighting device 110 so as to control the lighting device 110 according to the light setting. The transmitter 108 may comprise hardware for transmitting the control command via any wired or wireless communication protocol. Various wired and wireless communication protocols may be used, for example Ethernet, DMX, DALI, USB, Bluetooth, Wi-Fi, Li-Fi, 3 G, 4 G or ZigBee. A specific communication technology may be selected based on the communication capabilities of the lighting device 110, the power consumption of the communication driver for the (wireless) communication technology and/or the communication range of the signals.

The one or more lighting devices 110 may be any type of lighting devices 110 arranged for receiving lighting control commands. The one or more lighting devices 110 may comprise an LED light source, an incandescent light source, a fluorescent light source, a high-intensity discharge light source, etc. The one or more lighting devices 110 may be arranged for providing general lighting, task lighting, ambient lighting, atmosphere lighting, accent lighting, indoor lighting, outdoor lighting, etc. The one or more lighting devices 110 may be installed in a luminaire or in a lighting fixture. Alternatively, the one or more lighting devices 110 may be portable lighting devices (e.g. a hand-sized device, such as an LED cube, an LED sphere, an object/animal shaped lighting device, etc.) or wearable lighting devices (e.g. a light bracelet, a light necklace, etc.).

Figure 3:
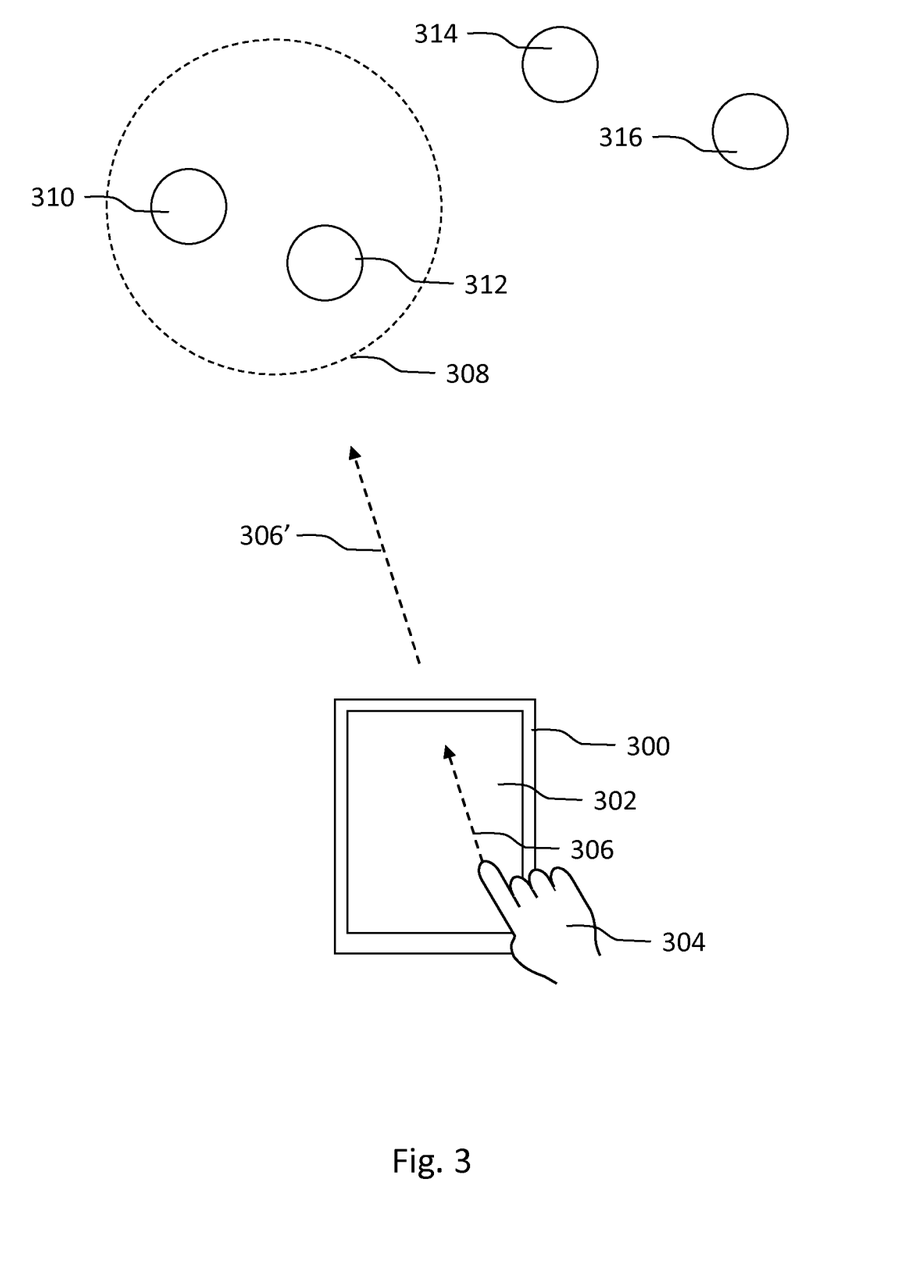
FIG. 3 shows schematically an embodiment of a touch sensitive device according to the invention for controlling two lighting devices located in an area.

The direction may be indicative of an area in the space, and the processor 102 may be further arranged for determining if the lighting device 110 is located in the direction by determining if the lighting device 110 is located in the area. FIG. 3 illustrates an example of such an area 308. FIG. 3 shows a top view of a lighting system comprising a user input device 300 comprising a touch screen 302 for receiving a first user input related to a selection of a light setting and a second user input 304 (e.g. a swipe gesture) indicative of a direction 306, 306'. In this example, the processor (not shown) may determine that lighting devices 310 and 312 are located in the area, and therefore generate a control command according to the light setting for these lighting devices 310, 312. Lighting devices 314 and 316 are located outside the area, and the processor does therefore not generate a control command for these lighting devices 314, 316. The size of area 308 may be predetermined, be user-defined or may be dependent on the intensity of the second user input. The speed of swiping or the force applied on the touch screen 302 may be indicative of the intensity.

Figure 4:
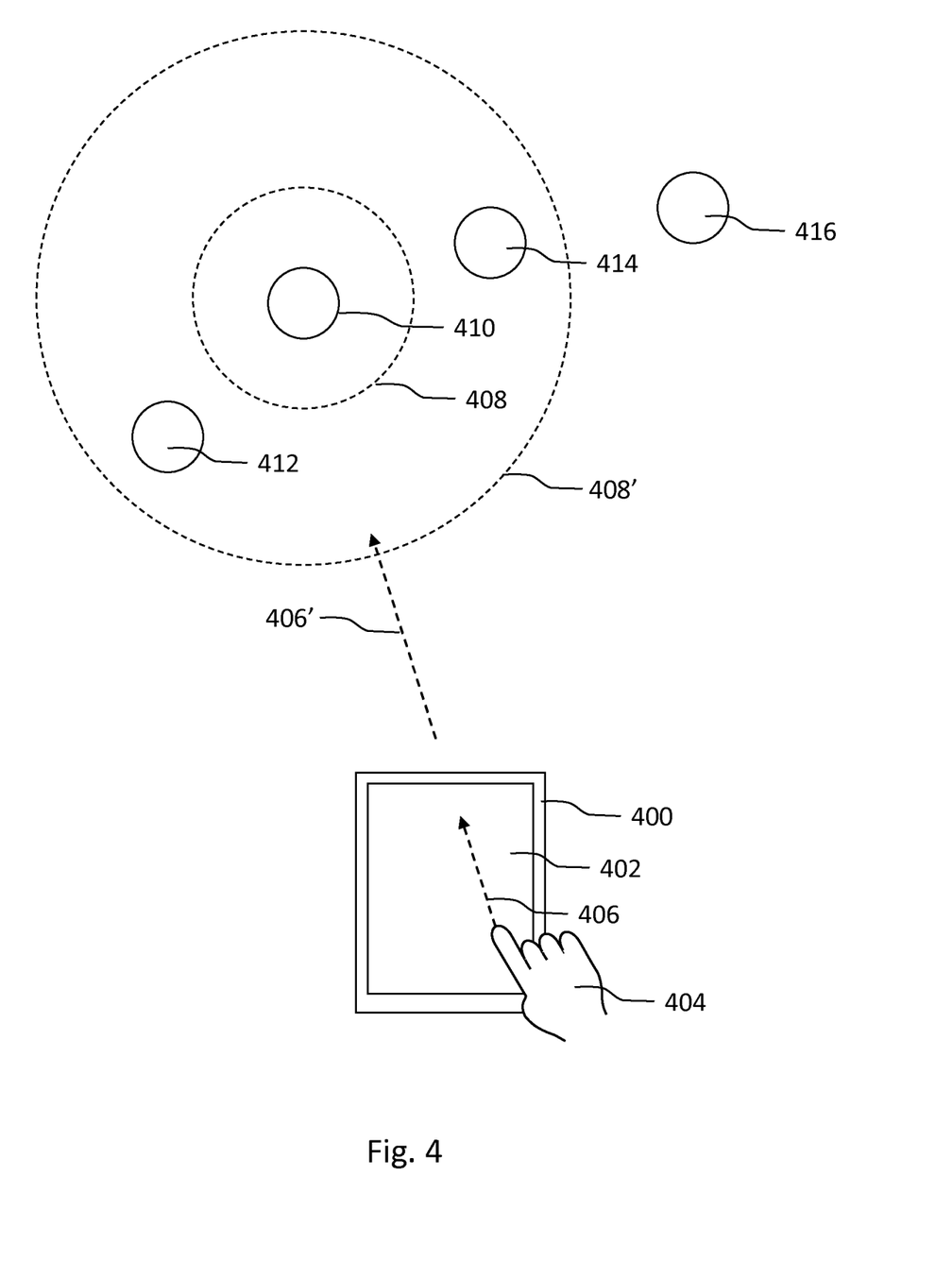
FIG. 4 shows schematically an embodiment of a touch sensitive device according to the invention for controlling a lighting device located in a first area according to a first light setting and two lighting devices located in a second area according to a second light setting.

The area may comprise a first area and a second area, and the processor 102 may be further arranged for determining if the lighting device 110 is located in the first area or in the second area. FIG. 4 illustrates an example of such a first area 408 and such a second area 408'. FIG. 4 shows a top view of a lighting system comprising a user input device 400 comprising a touch screen 402 for receiving a first user input related to a selection of a light setting and a second user input 404 (e.g. a swipe gesture) indicative of a direction 406, 406'. In this example, the processor (not shown) may determine that lighting device 410 is located in the first area 408 and therefore generate a first control command based on the light setting. The processor may further determine that lighting devices 412 and 414 are located in the second area 408' and the processor therefore generates a second control command based on a second light setting. Lighting device 416 is located outside the area, and the processor does therefore not generate a control command for this lighting device 416. The first user input may, for example, relate to a selection of a light setting that resembles a sunrise. Thus, the processor may generate a control command for lighting device 410, located in the first area 408, instructing it to emit a bright yellow light, and the processor may generate control commands for lighting devices 412 and 414, located in the second area 408', instructing them to emit a red light. This way the selected sunrise is reflected in the light effect created by the lighting devices 410, 412 and 414. This may, for example, also be applicable when a user desires to apply a light effect to an LED strip, or an LED array, because it allows the user to indicate which LED should be controlled as a 'central' LED, whereupon the 'central' LED and the 'peripheral' LEDs are controlled to create the overall lighting effect. The sizes of areas may be predetermined, be user-defined or may be dependent on the intensity of the second user input. The speed of swiping or the force applied on the touch screen 402 may be indicative of the intensity.

Figure 5:
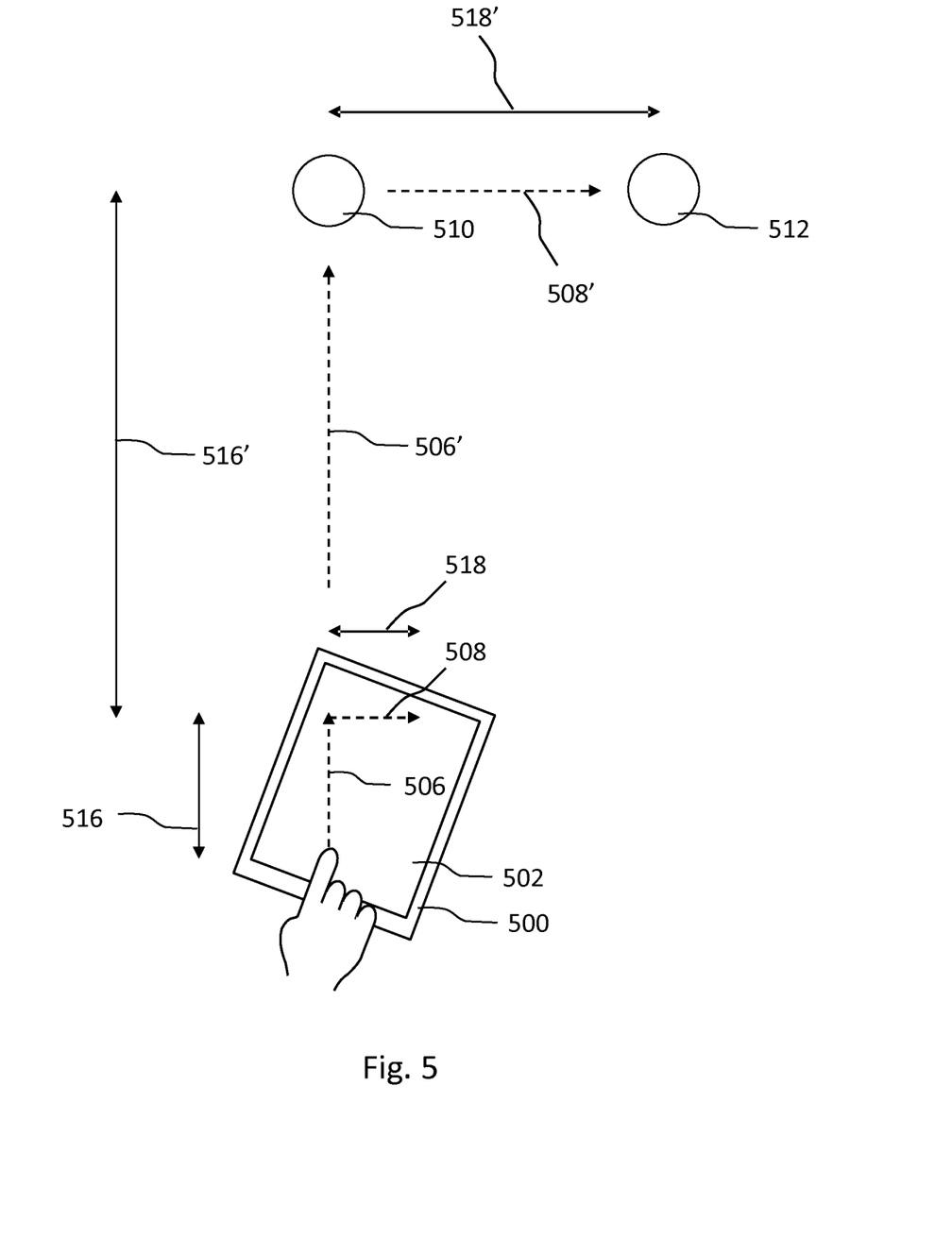
FIG. 5 shows schematically an embodiment of a touch sensitive device according to the invention for controlling two lighting devices located by providing two second user inputs.

The second user input may be further indicative of a distance, and the processor 102 may be further arranged for determining if the lighting device 110 is located within a predetermined proximity of the distance as indicated by the second user input. FIG. 5 illustrates an example of how the distance as indicated by the second user input is translated into a distance in the space wherein the lighting devices 510, 512 and the user input device 500 are located. The translation from the input distance and the actual distance may, for example, be multiplied linearly or exponentially, thereby allowing a user to indicate a large distance on a small input surface. The predetermined proximity (e.g. a threshold value) may be dependent on the translation, or based on the user input (e.g. a shorter distance may have a lower threshold and a longer distance may have a higher threshold). FIG. 5 shows a top view of a lighting system in a space comprising a user input device 500 comprising a touch screen 502 for receiving a first user input related to a selection of a light setting and a second user input 504 (e.g. a two-part swipe gesture) indicative of two directions 506 and 508. The first part of the swipe gesture 506 is indicative of distance 516, which may be translated into the distance 516', whereupon the processor (not shown) may determine that lighting device 510 is located in the direction 506' and located within a predetermined proximity of the distance 516'. The second part of the swipe gesture 508 is indicative of distance 518, which may be translated into the distance 518', whereupon the processor may determine that lighting device 512 is located in the direction 508' relative to the location of lighting device 510, and located within a predetermined proximity of the distance 518'. This allows a user to select a light setting, for example by touching an icon of a light setting (e.g. an icon of a green light setting) on the touch screen, and drag (swipe) the icon in the direction of lighting device 510 and subsequently drag (swipe) the icon in the direction of lighting device 512, thereby indicating that the light setting (a green light) should be applied to both lighting devices 510, 512. Thus, in this example, the processor generates one or more control commands for the lighting devices 510 and 512 to control their light output accordingly.

Figure 6:
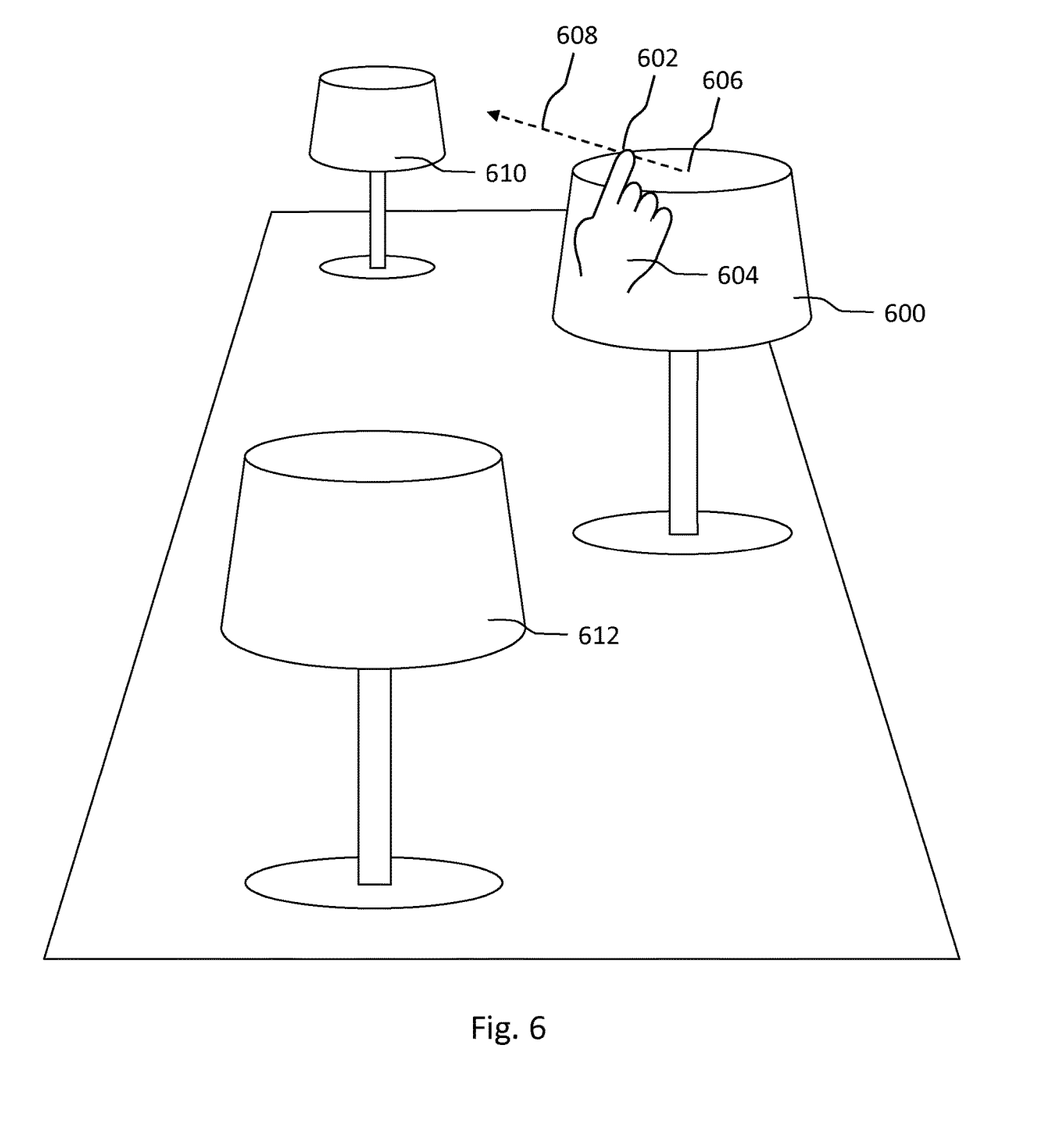
FIG. 6 shows schematically an embodiment of a touch sensitive luminaire according to the invention for controlling another luminaire based one a user input.

FIG. 6 shows schematically a perspective view of a space comprising a touch sensitive luminaire 600 for controlling one or more luminaires. The luminaire 600 may for example comprise a touch sensitive surface, a piezoelectric sensor, one or more microphones, etc. for detecting a user input at a location on the luminaire. The first user input related to the light setting may be received at the luminaire, or from a remote control device that is arranged for controlling the light output of the luminaire. The second user input indicative of a direction relative to the user input device may be sensed at the luminaire 600. In the example of FIG. 6, a user may provide a user input 604 at an edge 602 of the luminaire, thereby indicating the direction. The processor (not shown) may determine the direction 608 by extrapolating a path from reference point 606 of the user input 600 device through the input point 602, and, based on the location and orientation of the luminaire 600 and the locations of the other luminaires 610 and 612, determine that luminaire 610 is located in the direction. As a result, the processor may generate a control command for lighting device 610, which control command comprises instructions for controlling lighting device 610 according to the light setting of the first user input. This light setting may for example be the active light setting of luminaire 600, thus allowing a user to copy the light setting of luminaire 600 to another luminaire by providing the second user input indicative of the direction.

Figure 7:
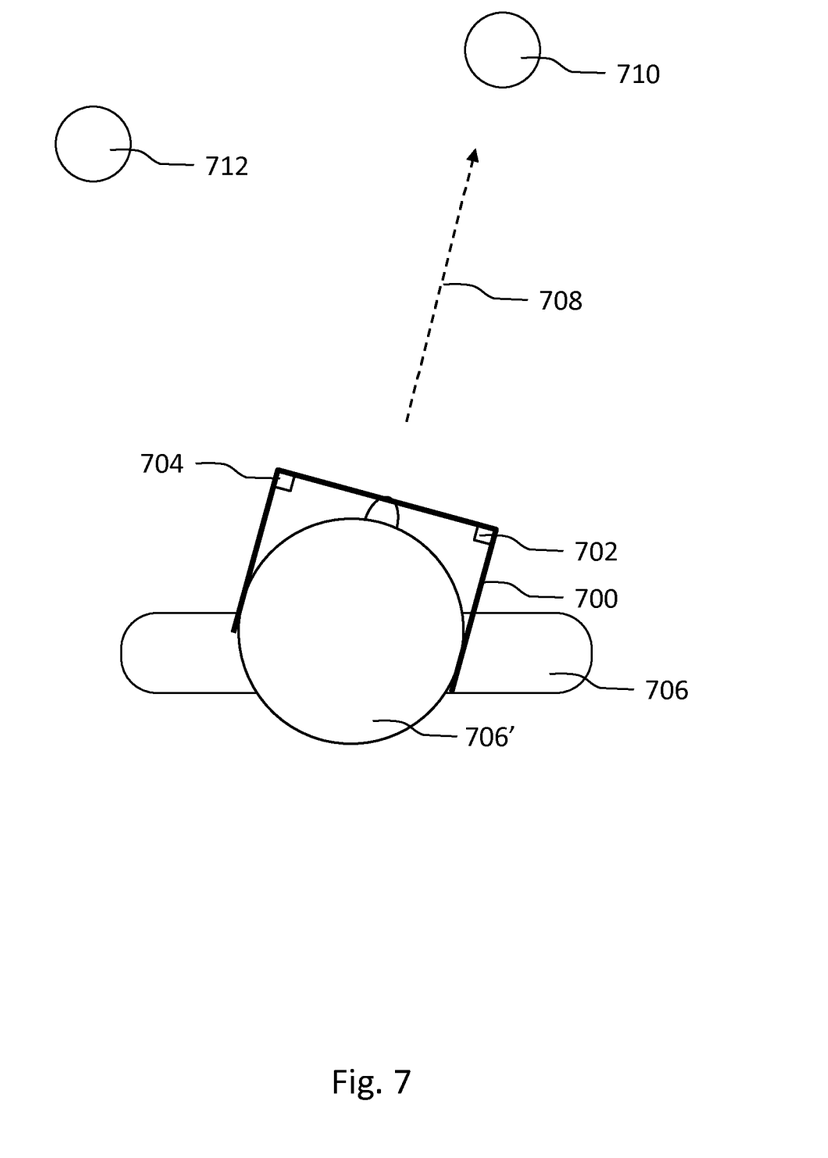
FIG. 7 shows schematically an embodiment of a wearable user input device according to the invention for controlling at least one lighting device in a space.

FIG. 7 shows schematically a top view of a lighting system comprising a wearable user input device 700 (such as smart glasses) for controlling a lighting device in a space. In this example, the direction is determined by the orientation of the user's head 706' (and therewith the orientation of the wearable user input device 700). This allows a user 706 to look at a lighting device to provide the second user input indicative of the direction. The wearable device may comprise a location sensor and/or an orientation sensor 702 for determining its location and/or orientation, respectively. A user may provide a gesture representative of the first user input to select a light setting for the lighting device, which may be detected by a camera comprised in the wearable user input device 700, or the user may provide a voice command representative of the first user input to select a light setting for the lighting device. In this example, the processor (not shown) of the wearable user input device 700 may determine that lighting device 710 is located in the direction 708 based on the location and the orientation of the wearable user input device 700 and on the locations of the lighting devices 710 and 712. The wearable user input device may comprise a microphone 704 for detecting a first user input, such as a voice command (e.g. "set to green") or a sound command (e.g. a clapping sound).

It should be noted that FIGS. 2a-7 merely show schematic examples of determining if a lighting device is located in the direction in a 2 dimensional space. A skilled person will be able to design many alternatives, also for a 3 dimensional space, without departing from the scope of the appended claims.

Figure 8:
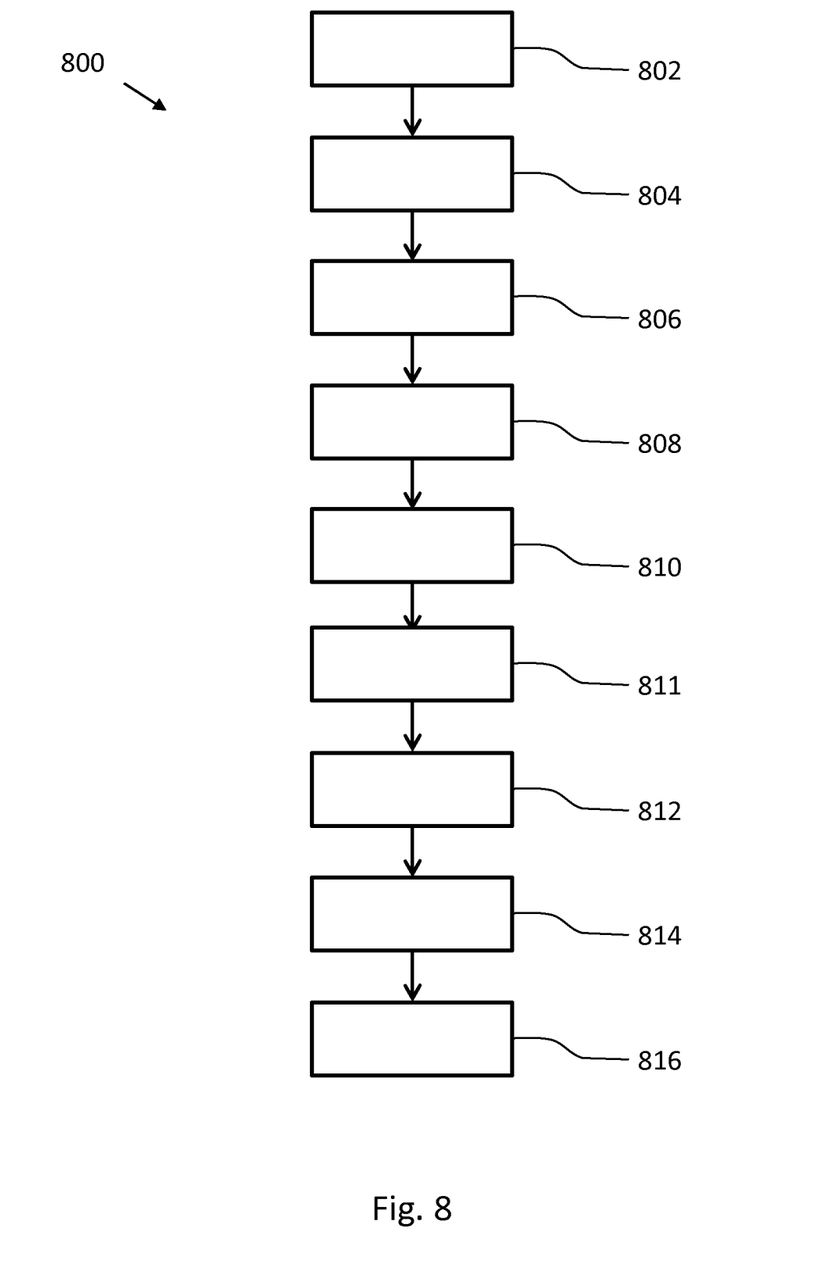
FIG. 8 shows schematically steps of a method according to the invention of controlling at least one lighting device in a space.

FIG. 8 shows schematically steps of a method 800 according to the invention of controlling at least one lighting device in a space. The method 800 comprises the steps of:

receiving 802 a first user input related to a light setting, sensing 804 a second user input indicative of a direction relative to the user input device, obtaining 806 information indicative of an orientation of a user input device, obtaining 808 information indicative of a location of the user input device, obtaining 810 information indicative of locations of one or more lighting devices, determining 811, based on the locations of the one or more lighting devices 110 and the location and the orientation of the user input device 104, the location and the orientation of the user input device 104 relative to the one or more lighting devices 110, determining 812, based on the location and the orientation of the user input device relative to the one or more lighting devices, if a lighting device is located in the direction, generating 814 a control command for the lighting device based on the light setting, and transmitting 816 the control command to the lighting device so as to control the lighting device according to the light setting.

As illustrated above, the different components of the lighting system 100 may be arranged for executing any one of these method steps, or any other method step of the appended claims. The methods may (partially) be executed by computer program product for a computing device, the computer program product comprising computer program code to perform the method when the computer program product is run on a processing unit of the computing device.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A method of controlling at least one lighting device in a space, the method comprising the steps:
   receiving a first user input related to a light setting,
   sensing by a user input device a second user input indicative of a direction relative to the user input device; said input occurring without any user knowledge of location or direction of any lighting device,
   obtaining information indicative of an orientation of the user input device,
   obtaining information indicative of a location of the user input device, wherein said location is relative to the space wherein the user input device is located,
   obtaining information indicative of locations of one or more lighting devices,
   determining, based on the locations of the one or more lighting devices and the location and the orientation of the user input device, the location and the orientation of the user input device relative to the one or more lighting devices,
   determining, based on the location and the orientation of the user input device relative to the one or more lighting devices, if a lighting device is located in a direction that is substantially the same as the direction relative to the user input device,
   if a lighting device is so located, generating a control command for the lighting device based on the light setting, and
   transmitting the control command to the lighting device so as to control the lighting device according to the light setting.

2. The method of claim 1, wherein the direction is indicative of an area in the space, and wherein the step of determining if the lighting device is located in the direction that is substantially the same as the direction relative to the user input device comprises determining if the lighting device is located in the area.

3. The method of claim 2, wherein the area comprises at least a first area and a second area, and wherein the step of determining if the lighting device is located in the area further comprises determining if the lighting device is located in the first area or in the second area, and wherein the step of generating a control command for the lighting device based on the light setting comprises:
   generating a first control command for the lighting device based on the light setting if the lighting device is located in the first area, and
   generating a second control command for the lighting device based on a second light setting if the lighting device is located in the second area.

4. The method of claim 2, wherein the second user input is a touch input, and wherein the step of sensing the second user input further comprises sensing an intensity of the second user input, which intensity is based on a speed of a movement of the touch input and/or based on a pressure level of the touch input, and wherein the size of the area is determined by the intensity of the second user input.

5. The method of claim 1, wherein the second user input is further indicative of a distance, and wherein the step of determining if the lighting device is located in the direction that is substantially the same as the direction relative to the user input device further comprises determining if the lighting device is located within a predetermined proximity of the distance as indicated by the second user input.

6. The method of claim 1, wherein the second user input is sensed at an input point on the user input device, and wherein the direction relative to the user input device is determined by extrapolating a path from a reference point of the user input device through the input point.

7. The method of claim 1, wherein the second user input is a gesture, which gesture is indicative of at least two input points, and wherein the direction relative to the user input device is determined by extrapolating a path from a first input point of the at least two input points through a second input point of the at least two input points.

8. The method of claim 1, wherein the second user input is a sound input, and wherein the direction relative to the user input device is determined by the orientation of the user input device.

9. The method of claim 1 wherein the step of obtaining information indicative of locations of one or more lighting devices is performed without utilizing the user input device.

10. The method of claim 1 wherein the light setting, received in said step of receiving a first user input related to a light setting, relates to a desired light setting sought to be attained.

11. A computer non-transitory medium having stored therein instructions for causing a processor to execute a method for controlling at least one lighting device in a space, the medium comprising code for:
    receiving a first user input related to a light setting,
    sensing by a user input device a second user input indicative of a direction relative to the user input device; said second user input occurring without any user knowledge of location or direction of any lighting device,
    obtaining information indicative of an orientation of the user input device,
    obtaining information indicative of a location of the user input device, wherein said location is relative to the space wherein the user input device is located,
    obtaining information indicative of locations of one or more lighting devices,
    determining, based on the locations of the one or more lighting devices and the location and the orientation of the user input device, the location and the orientation of the user input device relative to the one or more lighting devices,
    determining, based on the location and the orientation of the user input device relative to the one or more lighting devices, if a lighting device is located in a direction that is substantially the same as the direction relative to the user input device, generating a control command for the lighting device based on the light setting.

12. A lighting system for controlling at least one lighting device in a space, the lighting system comprising:
    a user input device for receiving a first user input related to a light setting and for sensing a second user input indicative of a direction relative to the user input device; said second user input occurring without any user knowledge of location or direction of any lighting device,
    a receiver for receiving information indicative of an orientation of the user input device, and for receiving information indicative of a location of the user input device, wherein said location is relative to the space wherein the user input device is located,
    a processor for:
    a. obtaining information indicative of locations of one or more lighting devices, b. determining, based on the locations of the one or more lighting devices and the location and the orientation of the user input device, the location and the orientation of the user input device relative to the one or more lighting devices,
c. determining, based on the location and the orientation of the user input device relative to the one or more lighting devices, if a lighting device is located in a direction that is substantially the same as the direction relative to the user input device, and
d. if a lighting device is so located, generating a control command for the lighting device based on the light setting, and a transmitter for transmitting the control command to the lighting device so as to control the lighting device according to the light setting.

13. The lighting system of claim 12, wherein the direction is indicative of an area, and wherein the user input device is arranged for detecting an intensity of the first user input, and wherein the size of the area is determined by the intensity of the second user input.

14. The lighting system of claim 12, wherein the user input device comprises a touch sensitive element for detecting a swipe gesture as the second user input, which swipe gesture is indicative of the direction.

15. The lighting system of claim 12, wherein the user input device comprises the receiver, the processor and the transmitter.

16. The lighting system of claim 12, wherein the user input device comprises a location sensor and/or an orientation sensor for detecting the location and/or the orientation, respectively, of the user input device.

17. The lighting system of claim 12 wherein the processor obtains said information indicative of locations of one or more lighting devices without using the user input device.

18. The lighting system of claim 12 wherein the light setting received by the user input device relates to a desired light setting sought to be attained.

* * * * *